June 8, 1926. 1,587,785
L. MARSH ET AL
FISHERMAN'S BAIT AND TACKLE CARRIER
Filed June 13, 1925 2 Sheets-Sheet 2
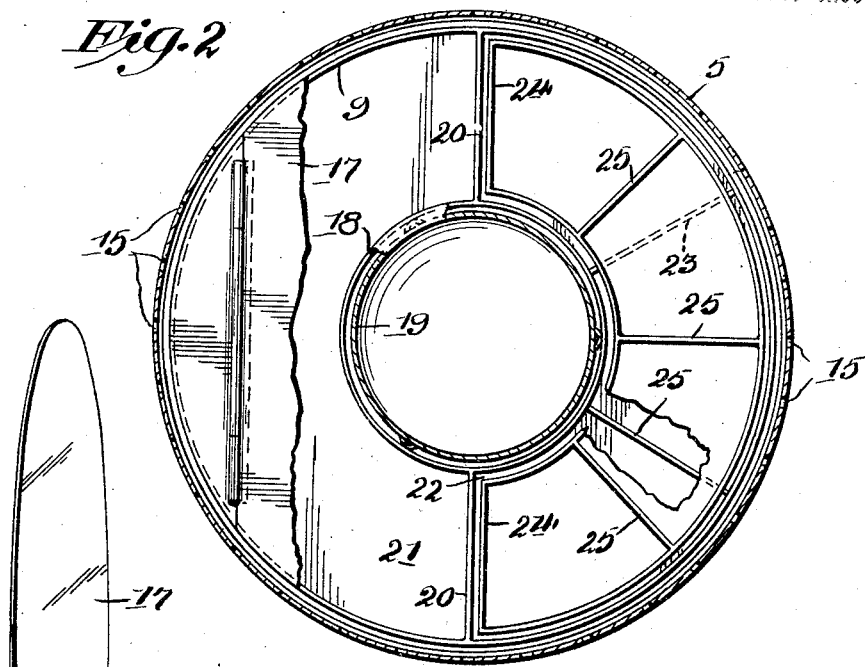
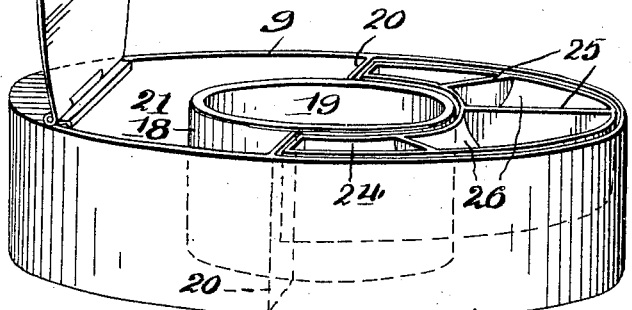
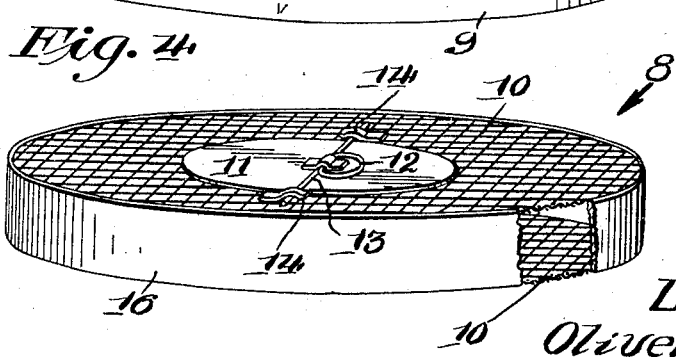
Inventors
Louis Marsh
Oliver J. Dufresne
By Stryker & Stryker
Attorneys Patented June 8, 1926.

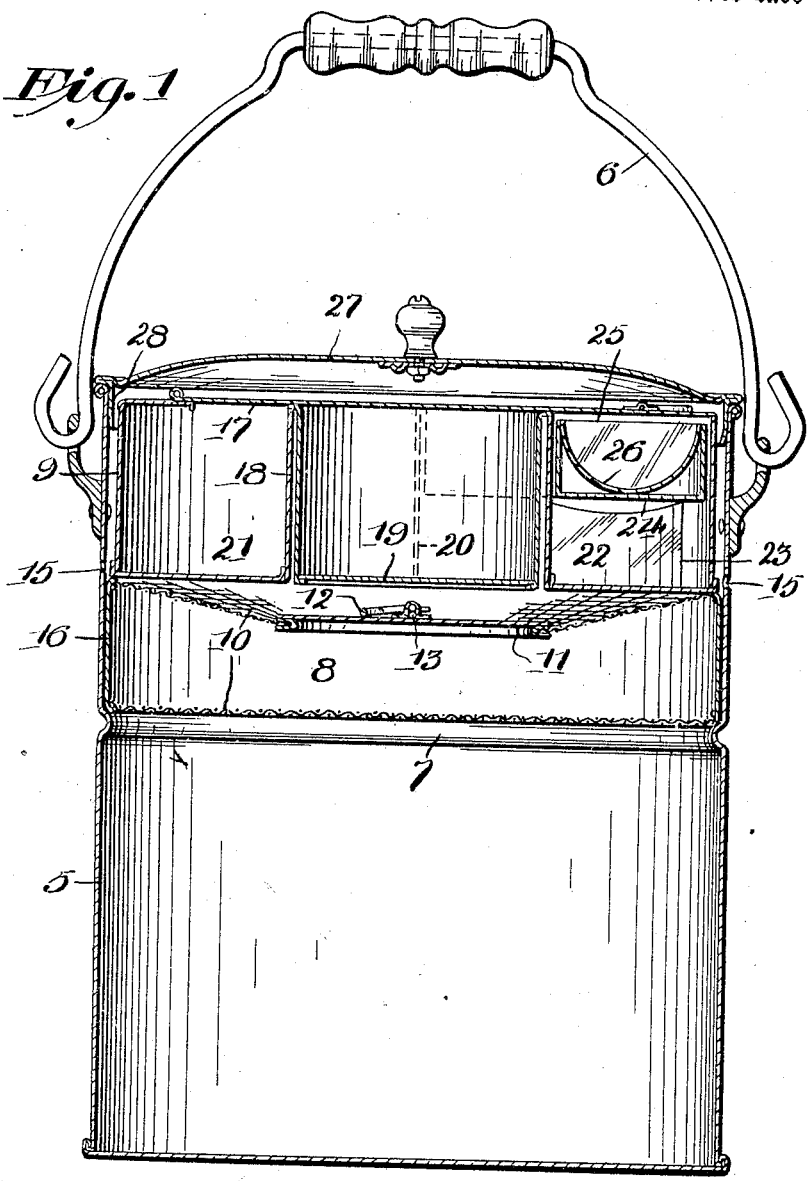

1,587,785

UNITED STATES PATENT OFFICE.

LOUIS MARSH AND OLIVER J. DUFRESNE, OF ST. PAUL, MINNESOTA; SAID LOUIS MARSH ASSIGNOR TO SAID OLIVER J. DUFRESNE.

FISHERMAN'S BAIT AND TACKLE CARRIER.

Application filed June 13, 1925. Serial No. 36,873.

It is our object to provide a peculiarly compact and conveniently arranged carrier for fish bait of the differing kinds usually required, including live and artificial bait, and also for the smaller tackle required by fishermen. This invention also includes certain novel features of construction which will be more fully pointed out in the following specification and claims.

Referring to the accompanying drawings, which illustrate the best form of our device at present known to us, Figure 1 is a central vertical section through our improved carrier; Fig. 2 is a horizontal section through the main container just above the lower tray and showing the upper tray in plan view with parts broken away to show details otherwise concealed; Fig. 3 is a perspective view of the upper tray for tackle and bait; Fig. 4 is a perspective view of the lower tray or basket particularly adapted for live frogs.

As illustrated, we provide a cylindrical container 5 having a bail 6 and adapted to carry water in the lower part thereof. Extending about the container 5, a little above the middle thereof, is an annular bead 7 adapted to support removable trays 8 and 9 in the top of the container. The tray 8, which is particularly adapted to carry live frogs for bait, is arranged to rest upon the bead 7 just above the surface of the water in the lower part of the container 5. The top and bottom of this container 8 are covered with wire or other foraminous material 10 and the top is provided with a central door 11 through which the bait may be inserted and withdrawn. This door has a handle 12 and a rod 13 extending at each side thereof to engage hook-like detents 14 of resilient material. These detents and the rod 13 are so arranged on the top of the tray 8 that the door 11 may be fastened in place thereon by clockwise turning. Thus, the ends of the rod 13 are brought into engagement with the resilient detents 14. To admit air to the live bait in the container 5, said container is formed with a series of perforations 15 (Figures 1 and 2) located just above the tray 8.

The tray 9 normally rests upon a metallic periphery 16 on the tray 8, and for convenience in handling may be provided with a hinged cover 17. A central well 18 extends through the tray 9 and is adapted to receive a cylindrical receptacle 19, suitable for carrying bait such as earth worms. This receptacle 19 is readily removable from the tray 8, so as to allow access to the door 7 of the tray 8. Radial partitions 20 extend outward from the well 18 to divide the tray 9 into semi-circular compartments 21 and 22, the latter compartment having radial partitions 23 dividing the lower part of the same into smaller pockets. An arcuate tray 24 fits in the top of the compartment 21, and is subdivided by partitions 25. This tray 24 is made readily removable to allow access to the pockets beneath the same in the tray 9. To facilitate removal of the contents of the tray 24, the bottoms 26 of the subdivisions are made concave, as clearly shown in Figure 1. A removable cover 27 is provided with a pendant flange 28 adapted to fit within the top of the container 5.

To prepare the carrier for use, it is only necessary to remove the top 27 and tray 9 and then to fill the container 5 to about the level of the bead 7 with water. After removing the tray 8, live minnows may be placed in the water in the container 5 when said tray may be replaced and frogs or other amphibious bait placed therein. Earth worms may be carried in the receptacle 19 and artificial bait and tackle in the several compartments 21, 22 and tray 24. Thus, all of the bait and small tackle required by a fisherman may be conveniently carried in the single compact container of this invention.

Having described our invention what we claim as new and desire to protect by Letters Patent is:

1. The combination with a container adapted to carry water in the lower part thereof, of a foraminous tray removably mounted above the water in said container, said tray being provided with a central door in its top for the removal of bait therefrom, a second tray for tackle and artificial bait removably mounted in said container above said first mentioned tray, said second tray being formed with a central well adapted to allow access to the door of said first mentioned tray, and a bait receptacle adapted to be suspended in said well.

2. The combination with a portable container adapted to carry water in the lower part thereof, of a foraminous tray removably mounted in said container, said tray being provided with an opening in its top for the removal of bait therefrom, and a second tray for tackle and bait removably mounted in said receptacle above said first mentioned tray, said second tray being formed with an opening adapted to allow access to said first mentioned tray.

3. The combination with a portable container adapted to carry water in the lower part thereof, a foraminous tray removably mounted in said container, said tray being provided with an opening in its top for the removal of bait therefrom, a second tray removably mounted in said receptacle above said first mentioned tray, said second tray being formed with an opening adapted to allow access to said first mentioned tray and partitions in said second tray radiating from said opening and forming a semi-circular chamber and a plurality of smaller chambers in said second tray.

4. The combination with a portable container adapted to carry water in the lower part thereof, a foraminous tray removably mounted in said container, said tray being provided with an opening in its top for the removal of bait therefrom, a second tray removably mounted in said receptacle above said first mentioned tray, said second tray being formed with an opening adapted to allow access to said first mentioned tray, partitions in said second tray radiating from said opening and forming a semi-circular chamber and a plurality of smaller chambers in said second tray and a third tray of semi-circular formation resting upon some of said partitions in said second tray.

In testimony whereof, we have hereunto signed our names to this specification.

OLIVER J. DUFRESNE.
LOUIS MARSH.